United States Patent [19]

Nagaishi et al.

[11] 4,106,288
[45] Aug. 15, 1978

[54] EXHAUST GAS REACTOR FOR INTERNAL COMBUSTION ENGINE AND ITS MANUFACTURING METHOD

[75] Inventors: Hatuo Nagaishi; Tooru Yoshimura, both of Yokosuka, Japan

[73] Assignee: Nissan Motor Company, Limited, Japan

[21] Appl. No.: 723,949

[22] Filed: Sep. 16, 1976

[30] Foreign Application Priority Data

Oct. 13, 1975 [JP] Japan .................................. 50/123508

[51] Int. Cl.$^2$ ................................................ F01N 3/10
[52] U.S. Cl. ........................................ 60/282; 60/323; 23/277 C; 181/238; 181/282
[58] Field of Search ............... 60/282, 323; 23/277 C; 181/40, 62

[56] References Cited

U.S. PATENT DOCUMENTS

| 3,488,723 | 1/1970 | Veazie | 60/282 |
| 3,703,083 | 11/1972 | Tadokoro | 60/323 |
| 3,864,909 | 2/1975 | Kern | 60/323 |
| 3,898,804 | 8/1975 | Morita | 60/323 |
| 3,990,856 | 11/1976 | Suzuki | 23/277 C |

*Primary Examiner*—Robert E. Garrett
*Attorney, Agent, or Firm*—Robert E. Burns; Emmanuel J. Lobato; Bruce L. Adams

[57] ABSTRACT

A reactor is made deformable by thermal stresses, as the construction thereof includes accordion type portions. The reactor comprises an inner core shell containing inlet and outlet pipe sections formed integral therewith, and extending outwardly through an outer core shell to an outer shell member. Each shell member consists of first and second shell counterparts which may be fixed together in a common plane.

16 Claims, 5 Drawing Figures

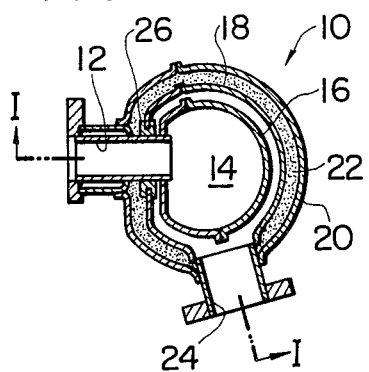
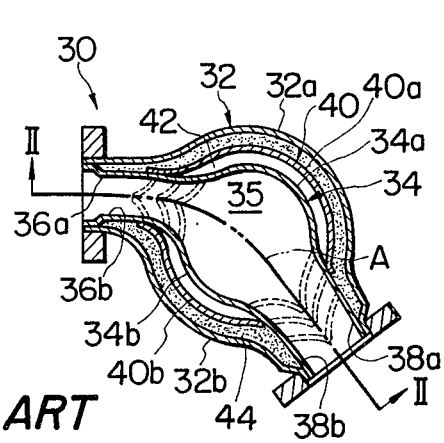
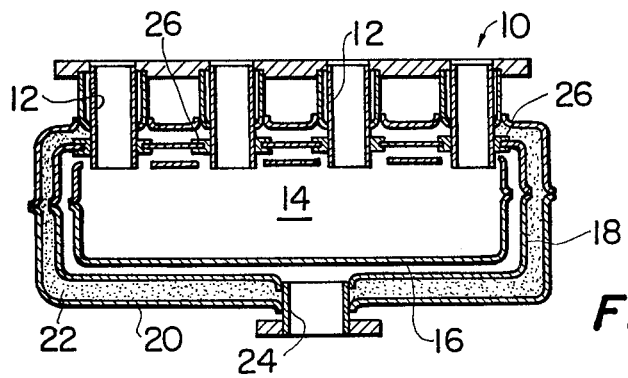
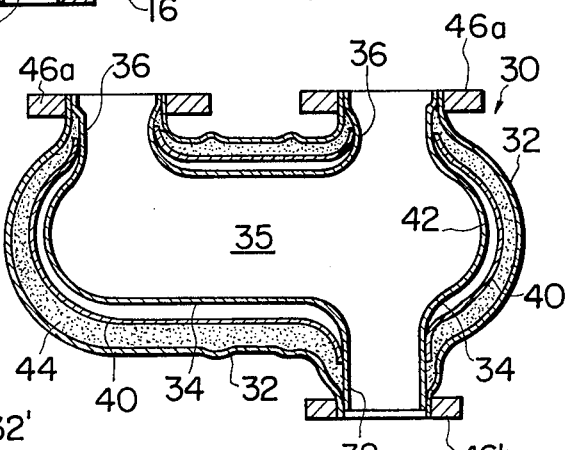
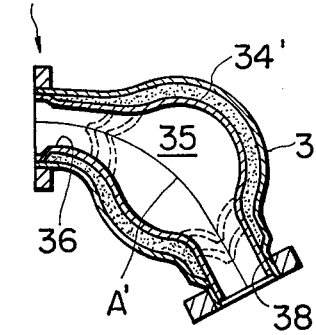

EXHAUST GAS REACTOR FOR INTERNAL COMBUSTION ENGINE AND ITS MANUFACTURING METHOD

BACKGROUND OF THE INVENTION

This invention relates to a deformable reactor wherein the unburned constituents contained in the exhaust gases discharged from the combustion chamber of an internal combustion engine are oxidized.

In connection with purification of the exhaust gases of internal combustion engines, it is well known in the art that, of the noxious constituents contained in the exhaust gases of the engine, carbon monoxide and hydrocarbons are oxidized in a reactor disposed downstream of the combustion chamber of the engine into harmless water and carbon dioxide. This oxidation reaction carried out in the reactor raises the reactor temperature to an excessively high level, but the reactor temperature is lowered and cooled when engine operation is stopped. The thermal stress depends on the excessively high temperature, and the considerable temperature change damages the reactor.

SUMMARY OF THE INVENTION

It is, therefore, an object of the present invention to provide an improved reactor which does not occur thermal damage caused by the thermal stress applied thereto during reactor temperature change.

Another object of the present invention is to provide an improved reactor of the construction capable of preventing local concentration of the thermal stresses applied to the reactor.

A further object of the present invention is to provide an improved reactor in which its exhaust gas inlet and its exhaust gas outlet are formed integrally with its inner core defining therein a reactor chamber for oxidation of the unburned constituents contained in the exhaust gases from the engine.

BRIEF DESCRIPTION OF THE DRAWINGS

Other objects, features and advantages of the reactor according to the present invention will be more apparent from the following description with reference to accompanying drawing in which like reference numerals indicate like parts and elements, and in which:

FIG. 1 is a vertical cross-section view of a prior art reactor;

FIG. 2 is a cross-sectional view taken along the line I—I of FIG. 1;

FIG. 3 is a vertical cross-section view of preferred embodiment of a reactor in accordance with the present invention;

FIG. 4 is a cross-sectional view taken along the line II—II of FIG. 3; and

FIG. 5 is a vertical cross-section view of another preferred embodiment of the reactor in accordance with the present invention.

DESCRIPTION OF THE PREFERRED EMBODIMENTS

Referring now to FIGS. 1 and 2, there is shown a prior art reactor 10 of the construction in which inlet pipes 12 project into and open to the reaction chamber 14 defined in an inner core shell 16. The inner core shell 16 is disposed within an outer core shell 18 which is, in turn, disposed within an outer shell 20. Insulating material is disposed between the inner surface of the outer shell 20 and the outer surface of the outer core shell 18. Reference numeral 24 indicates an outlet pipe. In this prior art reactor 10, the inlets 12 slidably contact particularly with the outer core shell 18 through devices 26 for allowing slidable contact between the outer surface of the inlet pipes 12 and the outer core shell 18. Accordingly, the inlet pipes 12 are allowed to expand and contract in their axial and radial directions.

In making this type of a reactor, the outer shell 20, the outer core shell 18, the inner core shell 16, the inlet pipes 12, the outlet pipe 24, the slidable devices 26 etc. are, at first, separately made, and thereafter these parts are assembled by welding and inserting one part into the other part. Accordingly, this type of a reactor is constructed from a considerably large number of parts causing a complex construction thereof, and therefore requires a relatively long time for assembly thereof inviting difficulty in production.

In view of the above, the present invention contemplates to overcome the disadvantages of the prior art reactor by forming the inlet pipes integrally with the reactor proper in which the thermal expansion and contraction of the inlet pipes are absorbed by the total deformation of the reactor, deleting the slidable device 26.

FIGS. 3 and 4 illustrate a preferred embodiment of a reactor 30 in accordance with the present invention, for oxidation of the unburned constituents contained in the exhaust gases discharged from the combustion chamber of an automotive internal combustion engine (not shown). The reactor 30 is composed of an outer shell 32 within which an inner core shell 34 defining therein a reaction chamber 35 is disposed spaced apart from the inner surface of the outer shell 32 to form a space (no numeral) between the inner surface of the outer shell 32 and the outer surface of the inner core shell 34. As shown, the inner core shell 34 is secured at its inlet portion 36 and at its outlet portion 38 to the inner surface of the outer shell 32. An outer core shell 40 is disposed in the space between the outer shell 32 and the inner core shell 34 to divide the space into a first insulation chamber 42 formed between the inner surface of the outer core shell 40 and the outer surface of the inner core 34 and a second insulation chamber 44 formed between the outer surface of the outer core shell 40 and the inner surface of the outer shell 32. The second insulation chamber 44 is filled with insulating material (no numeral). As seen, the outer core shell 40 is secured to the outer surface of the inlet and outlet portions 36 and 38 of the inner core shell 34. Reference numerals 46a indicate flange portions for securing the reactor 30, for example, to the cylinder head (not shown) of an internal combustion engine and 46b a flange portion for connecting the outlet portion 38, for example, to an exhaust pipe of the engine (not shown).

When making this reactor 30, first and second outer shell counterparts 32a and 32b, first and second inner core shell counterparts 34a and 34b, and first and second outer core counterparts 40a and 40b are, at first, individually or separately formed, for example, by press work. The respective counterpart is shaped as splitted by a common surface A including the center axes (not identified) of the inlet portions and the center axis (not identified) of the outlet portion 38 as shown in FIG. 3. In this step, a first inlet portion counterpart 36a and a first outlet portion counterpart 38a are integrally formed with the first inner core shell counterpart 34a, whereas a second inlet portion counterpart 36b and a second outlet portion counterpart 38b are integrally formed with the second inner core shell counterpart 34b. It will be understood that each counterpart is formed from a metal sheet. Thereafter, the first and second inner core counterparts 34a and 34b are combined or joined at the surface A by welding or seaming (joining of the edges of sheet-metal parts by interlocking folds) to form the inner core shell 34, in which the first and second inlet portion counterparts 36a and 36b are combined to form the inlet portions 36 and first and second outlet portion counterparts 38a and 38b are combined or joined to form the outlet portion 38. Then, the first and second outer core shell counterparts 40a and 40b are secured to the outer surfaces of the combined inlet portions 36 and the combined outlet portion 38, combining the counterparts 40a and 40b at the surface A spaced apart from the outer surface of the inner core 34. Subsequently, the first and second outer shell counterparts 32a and 32b are combined or joined at the surface A, disposing therein the inner core shell 34 equipped with the outer core shell 40 and spaced apart from the outer surface of the outer core 40. At this step, the inner core shell 34 is secured at its inlet portions 36 and its outlet portion 38 to the inner surface of the outer shell 32. Lastly, the flange portions 46a and 46b are respectively welded to the outer surfaces of the inlet and outlet portions 36 and 38. It will be understood that each counterpart of the outer shell 32, the outer core shell 40, and the inner core 34 may be formed of a metal sheet.

As best seen in FIG. 4, the outer shell 32, the inner core shell 34 and the outer core shell 40 are formed to decrease bent portions formed with sharp corners by totally rounding off, and accordingly local concentration of the thermal stresses is avoided improving the overall strength of the reactor 30. Additionally, portions adjacent the inlet portions 36 and the outlet portion 38 of the inner core shell 34 and the outer core shell 40 are gradually curved as shown and therefore they can easily be deformed to absorb the stresses generated by the radial and axial expansion between the inlet portions 36 and the outlet portion 38.

With the reactor of the configuration described above, if the temperature in the reactor 30 is raised to a high level by the oxidation reaction carried out in the reaction chamber 35 of the reactor 30, the reactor portions to which stresses are applied are easily deformed preventing local concentration of the stresses. This prevents the reactor 30 from thermal damage. Furthermore, since the inlet portions 36 and the outlet portion 30 are formed integral with the inner core 34, the gases in the reaction chamber 35 of the reactor 30 are prevented from leaking into the first insulation chamber 42 and to the insulating material in the second insulation chamber 44; conversely the insulating material is prevented from entering the reaction chamber 35. Accordingly, it will be understood that the thermal insulation of the reactor 30 is improved as compared with the prior art reactor shown in FIGS. 1 and 2, and consequently the oxidation reaction of carbon monoxide and hydrocarbons is effectively achieved accompanying improvement of the reaction efficiency. In addition, the reactor 30 of this configuration requires a decreased number of parts, allowing easy assembly of the reactor 30 compared with the prior art, because the reactor 30 according to the present invention does not require the slidable devices 26 employed in the prior art of FIGS. 1 and 2 and additionally it is constructed from integrally formed parts which are in the shape of generally half-splitted counterparts. This simplification in the construction contributes to make a reactor of light weight and of low production cost.

FIG. 5 illustrates another preferred embodiment of the reactor in accordance with the present invention, which reactor 30' is similar to the reactor 30 of FIGS. 3 and 4 with the exception that the outer core shell 40 is removed to fill the insulating material (no numeral) between the inner core shell 34' and the outer shell 32'. Also in this case, the outer shell 32' and the inner core shell 34' are formed by combining the generally half-splitted counterparts at the line A' similarly to the case of the FIGS. 3 and 4.

While only two embodiments have been shown and described, it will be understood that the principle of the present invention may be applied to reactors of other types.

What is claimed is:

1. A method of making a reactor including an outer shell, an inner core shell in said outer shell and spaced apart from the inner surface of said outer shell to form a space therebetween, said inner core shell defining therein a reaction chamber and having an inlet pipe portion and an outlet pipe portion, and an outer core shell disposed in said space to divide said space into two chambers, said outer core shell being secured to the outer surface of said inner core shell, comprising the steps of:

forming separately first and second outer shell counterparts;

forming separately first and second inner core shell counterparts, said first inner core shell counterpart having a first integral inlet pipe portion counterpart and a first integral outlet pipe portion counterpart and said second inner core shell counterpart having a second integral inlet pipe portion counterpart and a second integral outlet pipe portion counterpart;

forming separately first and second outer core shell counterparts;

combining said first and second inner core shell counterparts to form said inner core shell, in which said first and second integral inlet pipe portion counterparts are combined to form said inlet pipe portion and said first and second integral outlet pipe portion counterparts are combined to form said outlet pipe portion;

securing said first and second outer core shell counterparts to the outer surface of at least one of said inlet pipe or outlet pipe portions of said combined inner core shell, combining said first and second outer core shell counterparts to form said outer core shell; and combining said first and second outer shell counterparts, securely disposing said formed inner core shell with said formed outer core shell.

2. A method as claimed in claim 1, in which said forming steps are performed by pressing.

3. A method as claimed in claim 2, in which said combining steps are performed by welding.

4. A method as claimed in claim 2, in which said combining steps are performed by seaming.

5. A method as claimed in claim 2, in which said securing step is performed by welding.

6. A method as claimed in claim 1, in which said inner core counterparts, said outer shell counterparts, and said outer core shell counterparts are respectively combined at a common surface.

7. A deformable reactor for oxidation of the unburned constituents in the exhaust gases discharged from an internal combustion engine, comprising:

an outer shell defining therein a chamber;

an outer inlet pipe portion integral with said outer shell, the inside of said outer inlet pipe portion communicating with the chamber in the outer shell;

an outer outlet portion integral with said outer shell, the inside of said outer outlet pipe portion communicating with the chamber in said outer shell proper;

an inner core shell defining therein a reaction chamber in which the unburned constituents in the exhaust gases are oxidized, said inner core shell being disposed in said outer shell and spaced apart from the inner surface of said outer shell to form a space therebetween;

an inner inlet pipe portion integral with said inner core shell, the inside of said inner inlet pipe portion communicating with the reaction chamber in said inner core shell so as to introduce the exhaust gases from the engine into the reaction chamber, said inner inlet pipe portion being located inside of said outer inlet pipe portion and secured to the inner surface of said outer inlet pipe portion; and an inner outlet pipe portion integral with said inner core shell, the inside of said inner outlet pipe portion communicating with the reaction chamber in said inner core shell so as to discharge the exhaust gases in the reaction chamber out of the reactor, said inner outlet pipe portion being located inside of said outer outlet pipe portion and secured to the inner surface of said outer outlet pipe portion.

8. A reactor claimed in claim 7, in which said outer shell includes first and second counterparts, said outer inlet pipe portion includes first and second counterparts formed integral with the first and second counterparts of said outer shell, respectively, said outer outlet pipe portion includes first and second counterparts integral with the first and second counterparts of said outer shell, respectively, said inner core shell including first and second counterparts, said inner inlet pipe portion including first and second counterparts integral with the first and second counterparts of said inner core proper, respectively, and said inner outlet pipe portion including first and second counterparts integral with the first and second counterparts of said inner core proper, the first and second counterparts of each of said outer shell, said outer inlet pipe portion, said outer outlet pipe portion, said inner core shell, said inner inlet pipe portion, and said inner outlet pipe portion are fixed with each other at a common surface.

9. A reactor claimed in claim 8, further comprising an outer core shell disposed in the space defined between said outer shell and said inner core shell to divide the space into a first insulation chamber defined between the inner surface of said outer core shell and the outer surface of said inner core shell and a second insulation chamber defined between the outer surface of said outer core shell and the inner surface of said outer shell, a medium inlet pipe portion formed integral with said outer core shell, the inside of said medium inlet pipe portion communicating with the inside of said outer core shell, said medium inlet pipe portion being disposed around the inner inlet pipe portion and secured to the outer surface of the inner inlet pipe portion, and a medium outlet pipe portion integral with the outer core shell, the inside of said medium outlet pipe portion communicating with the inside of said outer shell, and said medium outlet pipe portion being disposed around the inner outlet pipe portion and secured to the outer surface of said inner outlet pipe portion.

10. A reactor as claimed in claim 9, in which said outer core shell includes first and second counterparts, said medium inlet pipe portion including first and second counterparts integral with the first and second counterparts of said outer core shell, respectively, and said medium outlet pipe portion includes first and second counterparts integral with the first and second counterparts of said outer core shell, respectively, the first and second counterparts of each of said outer core shell, said medium inlet pipe portion, and said medium outlet pipe portion are fixed with each other at said common surface.

11. A reactor as claimed in claim 10, further comprising an insulating material filling said second insulation chamber.

12. A method of making a reactor including an outer shell and an inner core shell disposed in said outer shell and spaced apart from the inner surface of said outer shell to form a space therebetween, the inner core defining thereinside a reaction chamber, said method comprising the steps of:

forming separately first and second outer shell counterparts, said first outer shell counterparts having its shell portion, and a first inlet pipe portion counterparts and a first outlet pipe portion counterparts integral with the shell portion, said second outer shell counterpart having its shell portion, and a second inlet pipe portion counterpart and a second outlet pipe counterpart which are integral with the shell portion;

forming separately first and second inner core shell counterparts, said first inner core shell counterparts having a shell portion and, a first inlet pipe portion counterpart and a first outlet pipe portion counterpart which are integral with the shell portion, said second inner core counterpart having a second inlet pipe portion counterpart and a second outlet pipe portion counterpart integral with the shell portion;

combining said first and second inner core shell counterparts, in which said first and second inlet pipe portion counterparts are combined with each other to form an inlet pipe portion of said inner core shell, and said first and second outlet pipe portion counterparts are combined with each other to form an outlet pipe portion of said inner core shell; and combining said first and second outer shell counterparts, disposing the complete inner core shell in the combined outer shell, in which said first and second inlet pipe portion counterparts are combined with each other to form an inlet pipe portion of said outer shell, securing said inlet pipe portion of said outer shell at its inner surface to the outer surface of said inlet pipe portion of said inner core shell, and first and second outlet pipe portion counterparts being combined with each other to form an outlet pipe portion of said outer shell, said outlet portion of said outer shell being secured at its inner surface to the outer surface of said outlet pipe portion of said inner core.

13. A method as claimed in claim 12, in which said inner core shell counterparts and said outer shell counterparts are respectively combined at a common surface.

14. A method as claimed in claim 13, in which said forming steps are performed by pressing.

15. A method as claimed in claim 14, in which said combining steps are performed by welding.

16. A method as claimed in claim 14, in which said combining steps are performed by seaming.

* * * * *